(12) United States Patent
Liu et al.

(10) Patent No.: US 11,537,659 B2
(45) Date of Patent: Dec. 27, 2022

(54) METHOD FOR READING AND WRITING DATA AND DISTRIBUTED STORAGE SYSTEM

(71) Applicant: BEIJING BAIDU NETCOM SCIENCE AND TECHNOLOGY CO., LTD., Beijing (CN)

(72) Inventors: Jian Liu, Beijing (CN); Dongliang Li, Beijing (CN); Tianxing Gao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 261 days.

(21) Appl. No.: 15/535,007

(22) PCT Filed: Dec. 3, 2015

(86) PCT No.: PCT/CN2015/096235
§ 371 (c)(1),
(2) Date: Jun. 9, 2017

(87) PCT Pub. No.: WO2017/049764
PCT Pub. Date: Mar. 30, 2017

(65) Prior Publication Data
US 2018/0203942 A1    Jul. 19, 2018

(30) Foreign Application Priority Data
Sep. 24, 2015 (CN) .......................... 201510616481.3

(51) Int. Cl.
*G06F 16/901* (2019.01)
*G06F 16/182* (2019.01)
(Continued)

(52) U.S. Cl.
CPC .......... *G06F 16/9014* (2019.01); *G06F 16/13* (2019.01); *G06F 16/182* (2019.01); *G06F 16/1805* (2019.01); *G06F 16/90335* (2019.01)

(58) Field of Classification Search
None
See application file for complete search history.

(56) References Cited

U.S. PATENT DOCUMENTS

| 7,685,109 | B1 * | 3/2010 | Ransil | G06F 11/1446 |
| | | | | 707/999.003 |
| 7,693,813 | B1 * | 4/2010 | Cao | G06F 16/313 |
| | | | | 707/999.001 |

(Continued)

FOREIGN PATENT DOCUMENTS

| CN | 101072160 A | 11/2007 |
| CN | 101355591 A | 1/2009 |

(Continued)

OTHER PUBLICATIONS

Kim, "A Good Network Connects Ceph to Faster Performance," Aug. 27, 2015 (Year: 2015).*

(Continued)

*Primary Examiner* — Yu Zhao
(74) *Attorney, Agent, or Firm* — Seed Intellectual Property Law Group LLP

(57) ABSTRACT

The present application discloses a data read and write method and a distributed storage system. A specific implementation of the method includes: receiving, from a client, by a shard server, a processing request on shard data, the processing request comprising a data identifier of the shard data; processing the processing request based on a hash table pre-loaded in a memory and indicating a correspondence (Continued)

between the data identifier of the shard data and a data index to obtain a processing result; and sending the processing result to the client.

21 Claims, 7 Drawing Sheets

(51) Int. Cl.
*G06F 16/13* (2019.01)
*G06F 16/18* (2019.01)
*G06F 16/903* (2019.01)

(56) References Cited

U.S. PATENT DOCUMENTS

| | | | |
|---|---|---|---|
| 2005/0004898 A1* | 1/2005 | Bluhm | G06F 16/951 |
| 2008/0215849 A1* | 9/2008 | Scott | G06F 16/9014 |
| | | | 711/216 |
| 2009/0157666 A1* | 6/2009 | Gehrke | G06F 16/951 |
| | | | 707/999.005 |
| 2009/0240664 A1* | 9/2009 | Dinker | G06F 12/0866 |
| 2012/0137290 A1* | 5/2012 | Berg | G06F 9/45504 |
| | | | 718/1 |
| 2012/0143873 A1* | 6/2012 | Saadat | G06F 16/278 |
| | | | 707/741 |
| 2012/0159523 A1* | 6/2012 | Kulkarni | G06F 9/5061 |
| | | | 719/328 |
| 2014/0108421 A1* | 4/2014 | Isaacson | G06F 16/27 |
| | | | 707/747 |
| 2014/0156632 A1* | 6/2014 | Yu | G06F 16/24545 |
| | | | 707/713 |
| 2014/0237090 A1* | 8/2014 | Lassen | H04L 41/082 |
| | | | 709/223 |
| 2014/0330785 A1* | 11/2014 | Isherwood | G06F 11/1446 |
| | | | 707/640 |
| 2014/0344236 A1* | 11/2014 | Xiao | G06F 16/2358 |
| | | | 707/696 |
| 2015/0095346 A1* | 4/2015 | Kimmel | G06F 3/0608 |
| | | | 707/747 |
| 2015/0234669 A1* | 8/2015 | Ben-Yehuda | G06F 3/0604 |
| | | | 718/1 |
| 2016/0077744 A1* | 3/2016 | Pundir | G06F 3/0608 |
| | | | 711/103 |

FOREIGN PATENT DOCUMENTS

| | | |
|---|---|---|
| CN | 101867607 A | 10/2010 |
| CN | 103678523 A | 3/2014 |

OTHER PUBLICATIONS

Elastic, "Index Modules," Apr. 19, 2015 (Year: 2015).*
Elastic, "Index Shard Allocation," Apr. 18, 2015 (Year: 2015).*

* cited by examiner

METHOD FOR READING AND WRITING DATA AND DISTRIBUTED STORAGE SYSTEM

CROSS-REFERENCE TO RELATED APPLICATION

This application is related to and claims priority from Chinese Application No. 201510616481.3, filed on Sep. 24, 2015, the entire disclosure of which is hereby incorporated by reference.

TECHNICAL FIELD

The present application relates to the field of computer technology, specifically to the field of distributed technology, and more specifically to a data read and write method and a distributed storage system.

BACKGROUND

Currently, there is massive data in networks. Such massive data is generally stored by using distributed storage systems. In an existing distributed storage system, data is generally stored by using sstable files, and reading of data is implemented by binary search in all the sstable files. When data is stored by using the above-mentioned distributed storage system, on one hand, because data in the sstable files are organized in order, the sstable files need to be merged and ordered frequently. In the case of large data length (for example, where the size of a single piece of data is 1 MB or more), completely random reading, and high throughput, the sstable file merging process consumes a large amount of resources, leading to a system bottleneck. On the other hand, the sstable file generally stores data in the form of three copies, requiring high storage costs.

SUMMARY

The present application provides a data read and write method and a distributed storage system, in order to solve the technical problem mentioned above.

According to a first aspect, the present application provides a data read and write method. The method comprises: receiving, from a client, by a shard server, a processing request on shard data, the processing request comprising a data identifier of the shard data, and the processing request being a write request or a read request; processing the processing request based on a hash table pre-loaded in a memory and indicating a correspondence between the data identifier of the shard data and a data index to obtain a processing result, the data index comprising a storage location of the shard data in a distributed file system; and sending the processing result to the client.

According to a second aspect, the present application provides a data read and write method. The method comprises: receiving a query request sent from a client, wherein the query request comprises a data identifier corresponding to to-be-processed shard data; and determining a shard server used for processing the to-be-processed shard data based on a hash value range that a hash value corresponding to the data identifier falls in, so that the client is capable of sending a processing request on the shard data to the shard server for processing the to-be-processed shard data, wherein each shard server is preset to correspond to a plurality of hash value ranges.

According to a third aspect, the present application provides a data read and write method. The method comprises: receiving a processing instruction on shard data, and sending a query request to a master server, the query request comprising a data identifier of the shard data; sending a processing request on the shard data to a shard server, the shard server being determined by the master server based on the data identifier of the shard data; and receiving a processing result returned from the shard server after the shard server processes the processing request.

According to a fourth aspect, the present application provides a distributed storage system. The system comprises: a client, configured to receive a processing instruction on shard data, and sending a query request to a master server, the query request comprising a data identifier of the shard data; send a processing request on the shard data to a shard server, the shard server being determined by the master server based on the data identifier of the shard data; and receive a processing result returned from the shard server after the shard server processes the processing request; a master server, configured to a query request sent from a client, wherein the query request comprises a data identifier corresponding to to-be-processed shard data; and determine a shard server used for processing the to-be-processed shard data based on a hash value range that a hash value corresponding to the data identifier falls in, so that the client is capable of sending a processing request on the shard data to the shard server for processing the to-be-processed shard data, wherein each shard server is preset to correspond to a plurality of hash value ranges; and a shard server, configured to, from a client, by a shard server, a processing request on shard data, the processing request comprising a data identifier of the shard data, and the processing request being a write request or a read request; process the processing request based on a hash table pre-loaded in a memory and indicating a correspondence between the data identifier of the shard data and a data index to obtain a processing result, the data index comprising a storage location of the shard data in a distributed file system; and send the processing result to the client.

The data read and write method and the distributed storage system that are provided in the present application, by receiving, from a client, by a shard server, a processing request on shard data, wherein the processing request comprises a data identifier of the shard data, processing the processing request based on a hash table that is pre-loaded in a memory and that indicates a correspondence between the data identifier of the shard data and a data index to obtain a processing result, and sending the processing result to the client, implement the read and write of data by using the hash table loaded in the memory, so that the processing time for a read request on shard data is close to the processing time for one random read request on the distributed file system, and therefore is as close as possible to the ultimate performance of the distributed file system. Compared with the prior art in which the sstable file is searched for shard data by binary search, the present application saves a large amount of time required for merging and search. In addition, the processing time for a write request on shard data is close to the time required for writing data to the index and data files in the distributed file system in append mode, thereby improving the performance of the distributed storage system.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
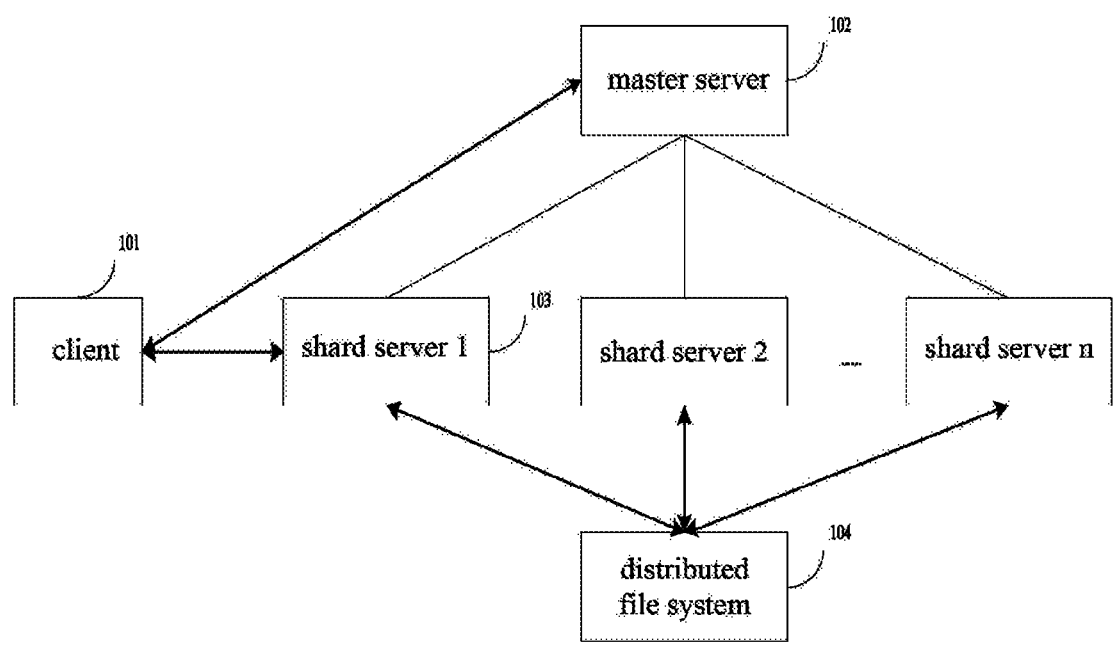
FIG. 1 is a schematic diagram of a system architecture to which a data read and write method of the present application can be applied.

FIG. 1 is a schematic diagram of a system architecture to which a data read and write method of the present application can be applied. In FIG. 1, a client 101, a master server 102 (or referred to as a Master server), a shard server 103 (or referred to as a UnitServer server), and a distributed file system 104 are illustrated. The master server 101 may be connected to multiple shard servers 103. The master server 102 may be configured to receive a query request from the client 101, and determine a shard server 103 used for processing a processing request (for example, a write request or a read request) on shard data. The shard server 103 may be configured to receive a processing request sent by the client 101, and process the processing request, for example, write shard data into the distributed file system 104 or read shard data from the distributed file system 104.

Figure 2:
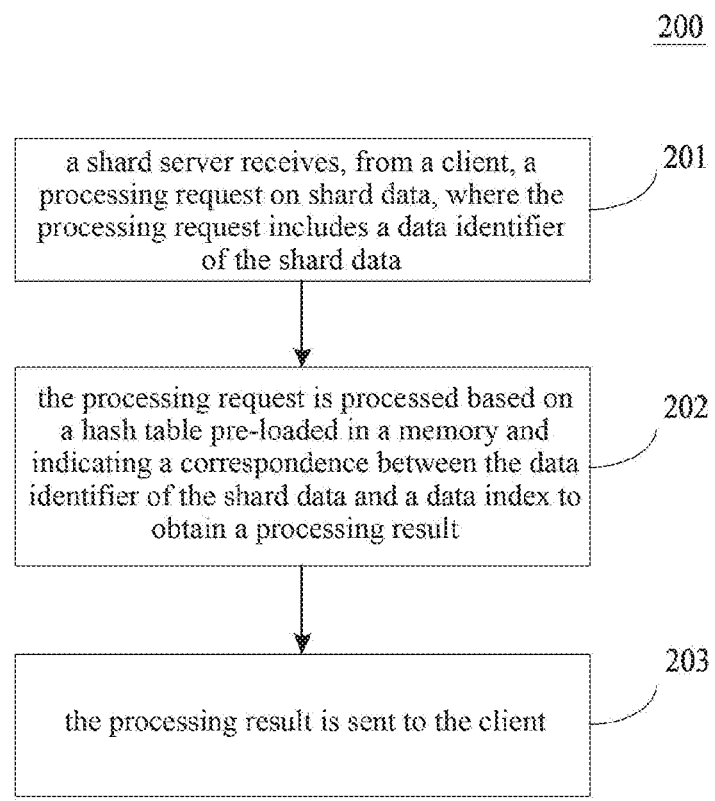
FIG. 2 is a flow chart of a data read and write method according to an embodiment of the present application.

Referring to FIG. 2, a flow 200 of a data read and write method according to an embodiment of the present application is illustrated. The data read and write method provided in this embodiment may be executed by a shard server. The method includes the following steps.

At step 201, a shard server receives, from a client, a processing request on shard data, where the processing request includes a data identifier of the shard data.

In this embodiment, the processing request includes a write request and a read request. In this embodiment, data may be read or written in units of shard data. For example, to write data corresponding to a dictionary into a distributed file system, the data corresponding to the dictionary may be divided into multiple parts of data, and each part of data is referred to as shard data. After the shard data is stored in the distributed file system, the shard data may be read in units of shard data. In this embodiment, the shard data may be preset to correspond to one data identifier (or referred to as a key).

At step 202, the processing request is processed based on a hash table pre-loaded in a memory and indicating a correspondence between the data identifier of the shard data and a data index to obtain a processing result.

In this embodiment, the data index includes a storage location of the shard data in a distributed file system. The hash table indicating the correspondence between the data identifier of the shard data and the data index may be pre-loaded in a memory of the shard server. The correspondence between the data identifier of the shard data and the data index may be established in the following manner: calculating a hash value corresponding to the data identifier by using a hash function, and then storing the data index corresponding to the data identifier to a location corresponding to the hash value in the hash table.

In this embodiment, the received processing request may be processed based on the hash table that is pre-loaded in the memory of the shard server and that indicates the correspondence between the data identifier of the shard data and the data index. For example, when the processing request is a read request on the shard data, the data index of the shard data may be found from the hash table according to the data identifier of the shard data. When the processing request is a write request on the shard data, the shard data may be written into the distributed file system, and then a data index returned by the distributed file system is obtained; meanwhile, a hash value corresponding to the identifier of the shard data may be calculated using a hash function, and then the data index is stored to a location corresponding to the hash value in the hash table. In this case, the shard data stored in the distributed file system may be referred to as a value. In this way, the storage of the shard data in the Key-Value form is achieved. A system constituted by the master server, the shard server, and the distributed file system may be referred to as a distributed storage system.

In this embodiment, because the data indexes of all the shard data are stored in the hash table, the data indexes are all loaded in the memory. Therefore, the processing time for a read request (or referred to as a query request) on shard data is close to the processing time for one random read request on the distributed file system, and therefore is as close as possible to the ultimate performance of the distributed file system. Compared with the prior art in which the sstable file is searched for shard data by binary search, the present application saves a large amount of time required for merging and search. In addition, the processing time for a write request on shard data is close to the time required for writing data to the index and data files in the distributed file system in append mode, thereby improving the performance of the distributed storage system.

In some optional implementations of this embodiment, the processing request is a write request, and the processing the processing request based on a hash table that is pre-loaded in a memory and that indicates a correspondence between the data identifier of the shard data and a data index to obtain a processing result includes: writing the shard data to the distributed file system by using a primary shard module, and obtaining a data index corresponding to the shard data, where the primary shard module is a primary shard module determined based on a hash value range that a hash value corresponding to the data identifier falls in; and writing the data identifier and the data index to a log file of the distributed file system, and updating the hash table corresponding to the primary shard module based on the data identifier and the data index.

In this embodiment, the primary shard module on the shard server may be preset to correspond to one hash value range, and the primary shard module used for processing the write request may be a primary shard module determined based on a hash value range that a hash value corresponding to the data identifier corresponding to the shard data falls in. Then, the shard data may be written into the distributed file system by using the primary shard module, to obtain a data index returned by the distributed file system. In this embodiment, the hash table corresponding to the primary shard module may be created in advance on the shard server, the primary shard module may maintain, by means of the hash table, the data identifier and the data index of the shard data that are written to the distributed file system by using the primary shard module, and then load the hash table into the memory of the shard server. In this embodiment, after the shard data may be written into the distributed file system by using the primary shard module to obtain the data index corresponding to the shard data, the hash table corresponding to the primary shard module may be updated based on the data identifier and the data index. That is, first, the hash value corresponding to the data identifier of the shard data that is written to the distributed file system is calculated; then, the data index is stored to a location corresponding to the hash value in the hash table corresponding to the primary shard module, thus establishing a correspondence between the identifier of the shard data and the data index.

In some optional implementations of this embodiment, the processing request is a read request, and the processing the processing request based on a hash table that is preloaded in a memory and that indicates a correspondence between the data identifier of the shard data and a data index to obtain a processing result includes: finding, by using a primary shard module based on a hash value corresponding to the data identifier, a data index corresponding to the data identifier from a location corresponding to the hash value in a hash table corresponding to the primary shard module, where the primary shard module is a primary shard module determined based on a hash value range that a hash value corresponding to the data identifier falls in; and reading the shard data from the distributed file system based on the data index.

In this embodiment, a primary shard module may be used to process the read request on the shard data, that is, read the shard data from the distributed file system. A hash value corresponding to the data identifier of the shard data may be calculated by using a hash function, then a data index is obtained from a location corresponding to the hash value in a hash table corresponding to the primary shard module, and the shard data is read from the distributed file system based on the data index.

In some optional implementations of this embodiment, the processing request is a read request, and the processing the processing request based on a hash table that is preloaded in a memory and that indicates a correspondence between the data identifier of the shard data and a data index to obtain a processing result includes: finding, by using a secondary shard module corresponding to the primary shard module based on the hash value corresponding to the data identifier, the data index corresponding to the data identifier from a location corresponding to the hash value in a hash table corresponding to the secondary shard module, where the secondary shard module is a secondary shard module determined based on the hash value range that the hash value corresponding to the data identifier falls in; and reading the shard data from the distributed file system based on the data index.

In this embodiment, the read request on the shard data may be processed by using a secondary shard module corresponding to the primary shard module. The secondary shard module may maintain a hash table, and the hash table may be a copy of the hash table maintained by the corresponding primary shard module. In this way, the secondary shard module may find, based on the data identifier of the shard data, the data index corresponding to the data identifier from the hash table, and then read the shard data from the distributed file system based on the data index.

Figure 3:
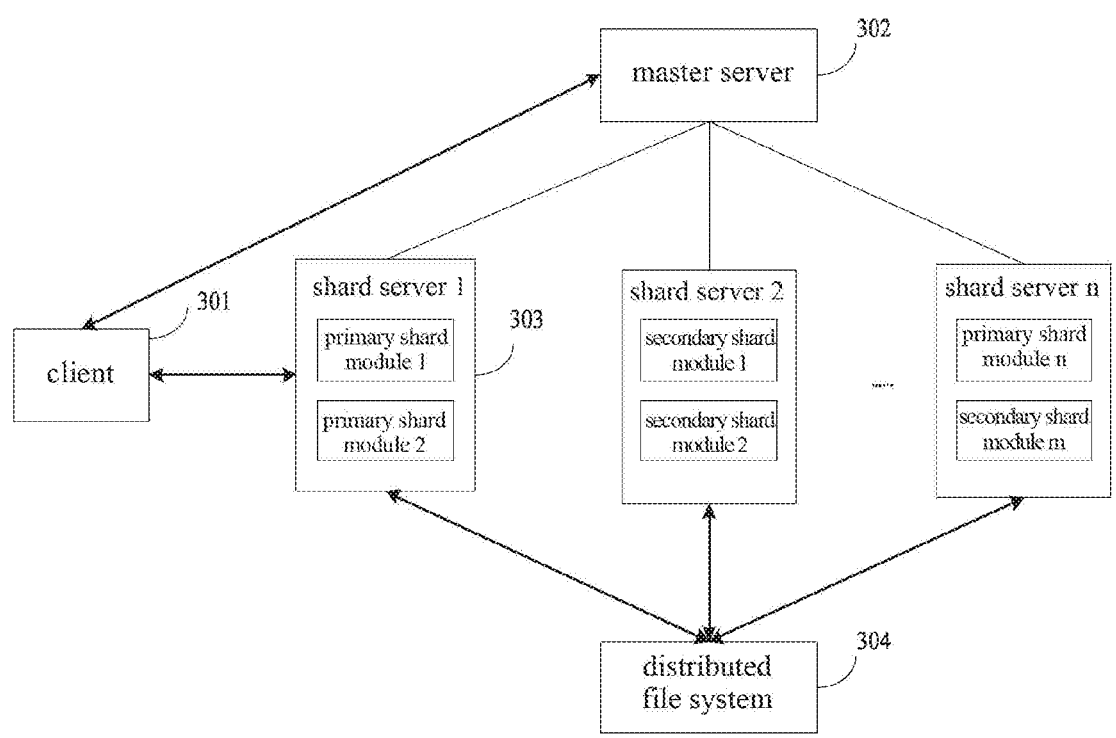
FIG. 3 is a schematic diagram of another system architecture to which a data read and write method of the present application can be applied.

Referring to FIG. 3, FIG. 3 is a schematic diagram of another system architecture to which a data read and write method of the present application can be applied. In FIG. 3, a client 301, a master server 302, shard servers 303, and a distributed file system 304 are illustrated. The shard server 303 includes primary shard modules and secondary shard modules. The primary shard module 1 and the primary shard module 2 may be located on the shard server 1, and the secondary shard module 1 and the secondary shard module 2 may be located on the shard server 2. In this embodiment, each primary shard module may correspond to one secondary shard module, to form a shard module pair. That is, the primary shard module 1 and the secondary shard module 1 form one shard module pair, and the primary shard module 2 and the secondary shard module 2 form one shard module pair. In this embodiment, the primary shard module can process a write request, and both the primary shard module and the secondary shard module can process a read request (or referred to as a query request).

In some optional implementations of this embodiment, when the primary shard module is faulty, the secondary shard module corresponding to the primary shard module is caused to serve as a primary shard module, so as to process the processing request.

In this embodiment, the primary shard module and the corresponding secondary shard module may be located on different shard servers, and the different shard servers access a network via different switches, thereby avoiding availability disasters caused by faulty switches. In addition, when the primary shard module and the corresponding secondary shard module are faulty at the same time, because the data identifier of the shard data and the data index are both stored in the distributed file system with high reliability, the data index can be rebuilt within a short period of time from the distributed file system, so as to resume the processing of the write request and the read request.

In this embodiment, the shard servers may also periodically send a heartbeat message to the master server, when the master server detects that heartbeat information of a shard server is lost, the master server may restore the primary shard module and the secondary shard module of this shard server on another shard server.

In some optional implementations of this embodiment, further includes: reading incremental information corresponding to the primary shard module from the log file every read cycle by using the secondary shard module, where the incremental information indicates new data identifiers and data indexes that are added compared with the previous read cycle; and updating the hash table corresponding to the secondary shard module based on the incremental information.

In this embodiment, the secondary shard module may read a log increment corresponding to the corresponding primary shard module from the log file in the distributed file system every second preset period, that is, read new data identifiers data indexes that are written by the primary shard module corresponding to the secondary shard module into the log, so as to update the hash table corresponding to the secondary shard module, so that the correspondence between data identifiers and data indexes that is maintained in the hash table corresponding to the secondary shard module is consistent with the correspondence between data identifiers and data indexes that is maintained in the hash table corresponding to the primary shard module. In this way, when the primary shard module is faulty, the secondary shard module corresponding to the primary shard module is caused to serve as a primary shard module, the secondary shard module can read the shard data that is written into the distributed file system by the primary shard module.

Figure 4:
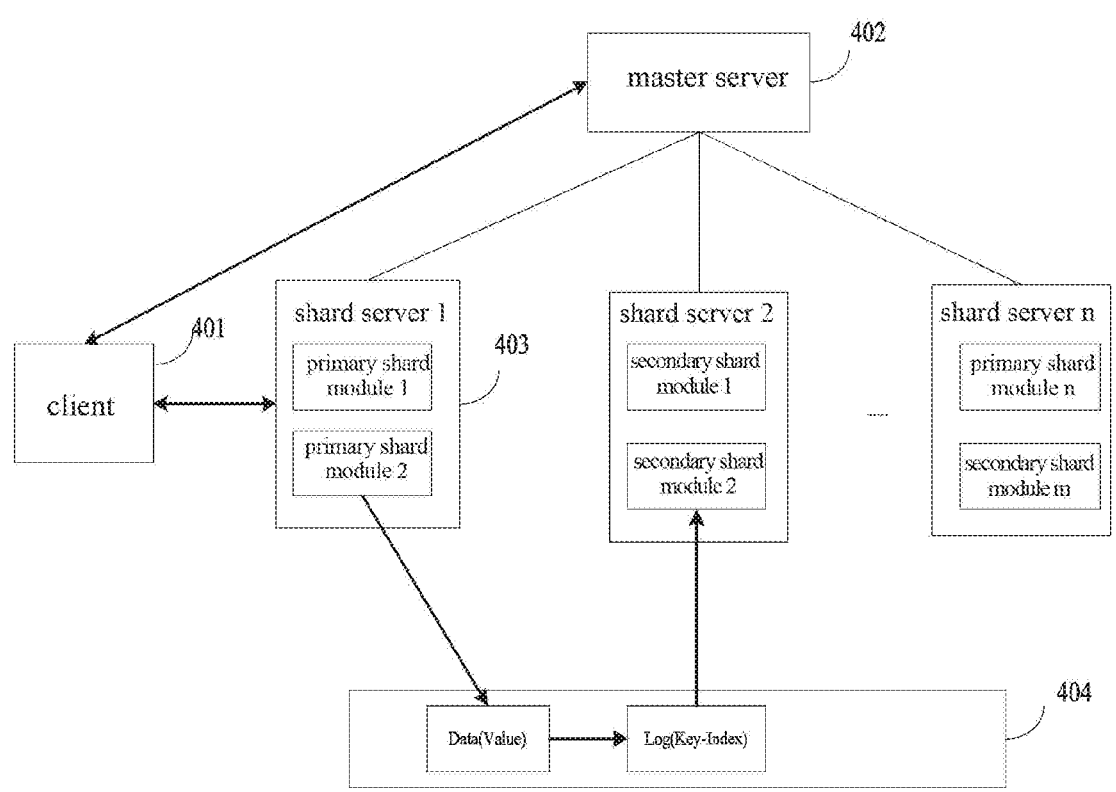
FIG. 4 is a schematic diagram illustrating the principle of reading/writing shard data.

Referring to FIG. 4, FIG. 4 is a schematic diagram illustrating the principle of reading/writing shard data in a data read and write method according to the present application. In FIG. 4, a client 401, a master server 402, shard servers 403, primary shard modules and secondary shard modules on the shard servers 403, and a distributed file system 404 are illustrated. The master server 402 records the distribution of the shard modules, that is, a shard module (a primary shard module or a secondary shard module) is located on which shard server 403.

The principle of reading/writing shard data is illustrated below by using a primary shard module 2 on a shard server 1 and a secondary shard module 2 on a shard server 2 that corresponds to the primary shard module 2. First, the process of writing shard data is illustrated. The master server 402 receives a query request sent by the client 401, and may determine, based on a range that a hash value corresponding to a data identifier of shard data falls in, that the hash value corresponding to the data identifier falls in a range of a hash value corresponding to the primary shard module 2, that is, determine to use the primary shard module 2 to process the write request on the shard data. It may also be determined according to a correspondence table between primary shard modules and shard servers that the primary shard module 2 is located on the shard server 2. In this case, the master server 402 may send identifiers of the shard server 2 and the primary shard module 2 to the client 401. The client 401 may send a write request to the shard server 2, where the write request may include the identifier of the primary shard module 2, so that when the write request reaches the shard server 2, the shard server 2 assigns the primary shard module 2 to process the write request. After receiving the write request sent by the client 401, the primary shard module 2 first checks whether a parameter associated with data write in the write request is valid. If the parameter is not valid, the primary shard module 2 sends error information to the client, and ends the flow. If the parameter is valid, the primary shard module 2 writes the shard data into a data file of the distributed file system in append mode, and receives a data index (Index) returned by the distributed file system 404. In this case, the shard data written into the data file of the distributed file system 404 may be referred to as a value. Then, the primary shard module 2 may write the identifier (Key) of the shard data and the data index (Index) corresponding to the shard data into a log file of the distributed file system, and at the same time, update the hash table corresponding to the primary shard module 2 by using the Key and the Index of the shard data, and return, to the client, indication information indicating that the write is successful.

The secondary shard module 2 reads incremental information corresponding to the primary shard module 2 in the log file of the distributed file system 403 every read cycle, that is, reads new data identifiers data indexes of shard data that are written by the primary shard module 2 into the distributed file system 404, and adds the new data identifiers and data indexes of the shard data into the hash table corresponding to the secondary shard module 2.

The following continues to illustrate the process of reading the shard data that is written to the distributed file system 404 by the primary shard module 2. Because the secondary shard module 2 and the primary shard module 2 may correspond to a same hash value range, the master server 402 may determine a shard module for processing the read request, that is, the primary shard module 2 or the secondary shard module 2, based on the principle of determining a shard server used for processing the processing request on the shard data in the above-mentioned process of writing shard data. In an example where the secondary shard module 2 processes the read request sent by the client, because the hash tables maintained by the secondary shard module 2 and the primary shard module 2 are consistent, the secondary shard module 2 may search, based on hash table that corresponds to the secondary shard module 2 and that is loaded in a memory, a data index corresponding to the data identifier of the shard data from the hash table, and then read the shard data from the distributed file system 404 based on the found data index. When the reading is successful, the shard data is returned to the client as a query result.

In some optional implementations of this embodiment, the writing the shard data to the distributed file system by using a primary shard module includes: copying the shard data by using the primary shard module to generate three data copies corresponding to the shard data, and writing the three data copies to the distributed file system in append mode; and encoding the three data copies by means of erasure coding, to generate 1.5 data copies corresponding to the shard data; and writing the 1.5 data copies to the distributed file system.

In this embodiment, when the shard data is written to the distributed file system by using a primary shard module, considering that the distributed file system does not support the function of appending data of any length, three data copies (or referred to as 3 copy files) corresponding to the shard data may be written into the distributed file system in append mode first; then the three data copies are encoded by means of erasure coding, to generate 1.5 data copies (or referred to as a 1.5 copy files) corresponding to the shard data; then the 1.5 copy files are transferred, that is, the 1.5 copy files are written into the distributed file system.

In this embodiment, the operation of transferring the 1.5 copy files may be provided by the distributed file system, but because the distributed file system does not support appending of the 1.5 copy files, the 1.5 copy files need to be written at a time. In this embodiment, the transfer of the 1.5 copy files may be performed during low traffic time periods, so as not to affect the system throughput during peak traffic time periods. After the transfer is completed, an index pointing to a new file is marked, and the reference count for the old file is reduced. When there is not read request requiring use of the old file, the old file may be deleted to release space.

In this embodiment, because the shard data is sequentially stored in the distributed file system, when one data identifier is updated, a void is generated, resulting in a waste of the space of the magnetic disk. For example, for one data identifier, when shard data corresponding to this data identifier is written into the distributed file system for the first time, the file length is 1 MB. When this data identifier is updated, 1 Mb data different from that written for the first time is inserted. If the write is still performed in append mode, the file length is 2 MB, where the last 1 Mb data in the file is correct data, and the first 1 Mb data in the file is invalid. Because the data identifier is already updated, a 1 Mb void is generated in the file. In this embodiment, data rewrite may be performed periodically to erase the void, so as to recover the space of the magnetic disk. Erasing the void by periodically performing data rewrite may be implemented in the following manner: The void ratio may be periodically collected. When the void ratio is higher than a threshold, a data rewrite operation may be triggered. The master server is responsible for sequentially reading all the data according to the order of the index file, and then rewriting the data into the distributed file system in a Content Addressing Storage (CAS) manner. If all the data in a data file has been rewritten, the data file is deleted. During the data rewrite process, if a data identifier is not updated, it is determined that the write is successful. Otherwise, it is determined that the data write fails. In this way, the void is eliminated after the rewrite is completed.

At step 203, the processing result is sent to the client.

In this embodiment, after the processing request is processed, a processing result can be obtained. When the processing request is a write request, information indicating that the write is successful may be returned to the client as the processing result. When the processing request is a read request, the shard data may be sent to the client as the processing result after the shard data is successfully read.

The data read and write method provided in this embodiment has the following characteristics:

1) High performance: The data indexes are all loaded in the memory by using the hash table loaded in the memory, so that the processing time for a read request (or referred to as a query request) on shard data is close to the processing time for one random read request on the distributed file system, and therefore is as close as possible to the ultimate performance of the distributed file system. Compared with the prior art in which the sstable file is searched for shard data by binary search, the present application saves a large amount of time required for merging and search. In addition, the processing time for a write request on shard data is close to the time required for writing data to the index and data files in the distributed file system in append mode.

2) Low costs: 1.5 copy files of the data file are transferred by using the distributed file system, which saves the storage space compared with the prior art where data is stored using 3 copies.

3) High reliability: The storage of data by using the distributed file system with high reliability provides the same reliability as that of the distributed file system, thereby improving the reliability of the distributed storage system. A corresponding secondary shard module is set for each primary shard module, and the primary shard module and the secondary shard module are located on different shard servers, so that there is no single node in the system. In addition, when the primary shard module and the corresponding secondary shard module are faulty at the same time, because the data identifier of the shard data and the data index are both stored in the distributed file system with high reliability, the data index can be rebuilt within a short period of time from the distributed file system, so as to resume the processing of the write request and the read request, thereby further improving the reliability of the distributed storage system.

Figure 5:
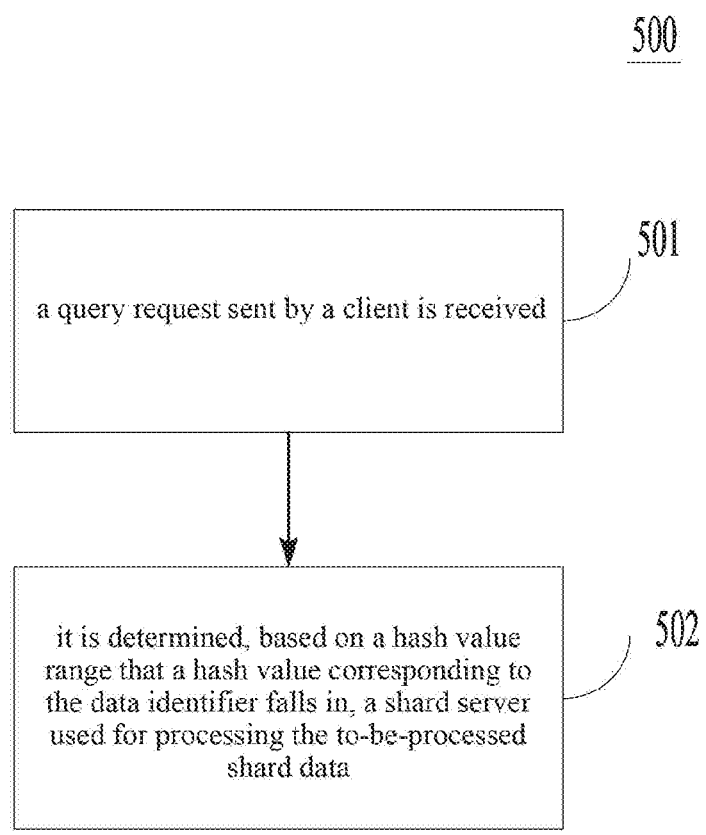
FIG. 5 is a flow chart of a data read and write method according to another embodiment of the present application.

Referring to FIG. 5, a flow 500 of a data read and write method according to an embodiment of the present application is illustrated. The data read and write method provided in this embodiment may be executed by a master server. The method includes the following steps.

At step 501, a query request sent by a client is received.

In this embodiment, the query request includes a data identifier corresponding to to-be-processed shard data. In this embodiment, data may be read or written in units of shard data. For example, to write data corresponding to a dictionary into a distributed file system, the data corresponding to the dictionary may be divided into multiple parts of data, and each part of data is referred to as shard data. After the shard data is stored in the distributed file system, the shard data may be read in units of shard data. In this embodiment, the shard data may be preset to correspond to one data identifier (or referred to as a key).

At step 502, it is determined, based on a hash value range that a hash value corresponding to the data identifier falls in, a shard server used for processing the to-be-processed shard data.

In this embodiment, each shard server may be preset to correspond to multiple hash value ranges.

In this embodiment, the shard server for processing the processing request may be determined in the following manner: calculating the hash value range that the hash value corresponding to the data identifier falls in, and when the hash value range that the hash value corresponding to the data identifier falls in is one of multiple hash value ranges that a shard server is preset to correspond to, using the shard server to process the to-be-processed shard data.

In some optional implementations of this embodiment, the determining, based on a hash value range that a hash value corresponding to the data identifier falls in, a shard server used for processing the to-be-processed shard data includes: determining, based on the hash value range that the hash value corresponding to the data identifier falls in, a primary shard module or a secondary shard module corresponding to the primary shard module for processing the to-be-processed shard data, where each pair of the primary shard module and the secondary shardshard module are preset to correspond to a same hash value range; and determining a shardshard server to which the primary shardshard module or the secondary shardshard module belongs based on a correspondence table between the primary shard module or the secondary shard module and the shard server In this embodiment, a primary shard module or a secondary shard module for processing the processing request may be determined first, and then, the shard server where the primary shard module or the secondary shard module is located is determined according to a correspondence between the primary shard module or the secondary shard module and the shard server. In this way, the processing request can be sent to the primary shard module or the secondary shard module of the determined shard server, so as to use the primary shard module or the secondary shard module to process the processing request.

In this embodiment, a correspondence between primary shard modules or secondary shard modules and shard servers and a correspondence between data identifiers of shard data and primary shard modules or secondary shard modules may be maintained in advance. First, by using the use of the primary shard module on the shard server to process the processing request sent by the client as an example, the correspondence between data identifiers of shard data and the primary shard modules is set in the following manner: a primary shard module corresponds to a hash table that indicates a correspondence between a data identifier and a data index of shard data that the primary shard module is responsible for processing. After calculation using a hash function is performed according to the data identifier of each shard data that is written by the primary shard module into the distributed file system, a corresponding hash value may be obtained. The primary shard module may be preset to correspond to one hash value range, that is, the primary shard module is responsible for processing a processing request on shard data that corresponds to a hash value within the hash value range, and then a correspondence between the data identifier of the shard data and the primary shard module is established. In this embodiment, the master server may determine, according to the correspondence between the primary shard module and the shard server and the correspondence between the data identifier of the shard data and the primary shard module, a shard server for processing the processing request and the primary shard module on the shard server for processing the processing request.

In this embodiment, the secondary shard module and the corresponding primary shard module may correspond to a same hash value range. Based on the above-mentioned principle of establishing a correspondence between data identifiers of shard data and primary shard modules, a correspondence between a data identifier of shard data and a secondary shard module may be established. In this way, when the secondary shard module is used to process the read request sent by the client, the master server may determine, according to the correspondence between the secondary shard module and the shard server and the correspondence between the data identifier of the shard data and the secondary shard module, a shard server for processing the read request and the secondary shard module on the shard server for processing the read request.

Figure 6:
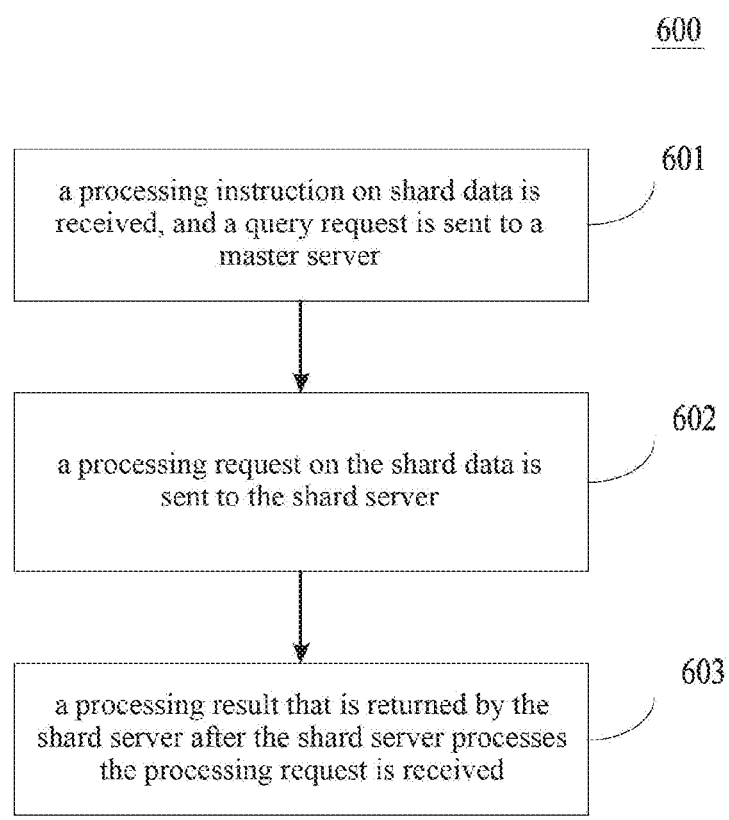
FIG. 6 is a flow chart of a data read and write method according to still another embodiment of the present application.

Referring to FIG. 6, a flow 600 of a data read and write method according to still another embodiment of the present application is illustrated. The data read and write method provided in this embodiment may be executed by a client. The method includes the following steps.

At step 601, a processing instruction on shard data is received, and a query request is sent to a master server.

In this embodiment, the query request includes a data identifier of the shard data. A processing instruction on shard data may be received first, and then a query request is sent to a master server, so as to determine a shard server used for processing a processing request on the shard data.

At step 602, a processing request on the shard data is sent to the shard server.

In this embodiment, a processing request on the shard data may be sent to the shard server that is determined by the master server based on the data identifier of the shard data, so as to use the determined shard server to process the processing request. For example, the primary shard module on the shard server may be used to write the shard data into the distributed file system. For another example, the primary shard module or the secondary shard module on the shard server may be used to read the shard data corresponding to the data identifier from the distributed file system.

At step 603, a processing result that is returned by the shard server after the shard server processes the processing request is received.

In this embodiment, after the processing request on the shard data is sent to the determined shard server, a processing result that is returned by the shard server after the shard server processes the processing request may be received. For example, when the processing request is a write request, indication information indicating that the write is successful may be obtained from. When the processing request is a read request, the shard data that is read from the distributed file system may be obtained from the shard server.

Figure 7:
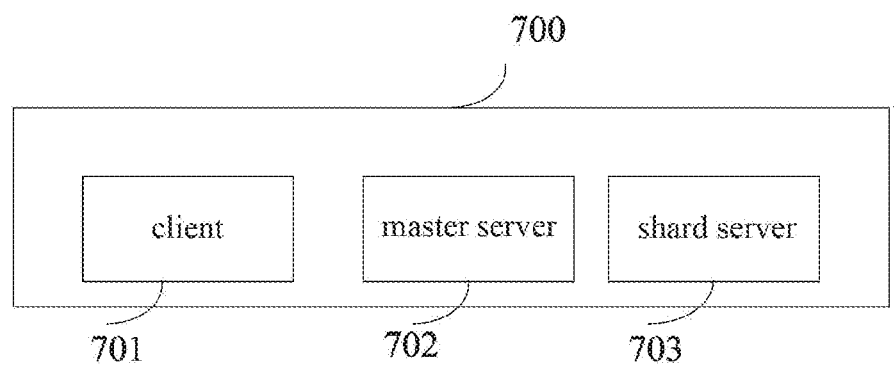
FIG. 7 is a schematic structural diagram of a distributed storage system according to an embodiment of the present application.

Referring to FIG. 7, a schematic structural diagram of a distributed storage system according to an embodiment of the present application is illustrated. The system 700 includes: a client 701, a master server 702, and a shard server 703. The client 701 is configured to receive a processing instruction on shard data, and send a query request to a master server, where the query request includes a data identifier of the shard data; send a processing request on the shard data to a shard server, where the shard server is a shard server determined by the master server based on the data identifier of the shard data; and receive a processing result that is returned by the shard server after the shard server processes the processing request. The master server 702 is configured to receive a query request sent by a client, where the query request includes a data identifier corresponding to to-be-processed shard data; and determine, based on a hash value range that a hash value corresponding to the data identifier falls in, a shard server used for processing the to-be-processed shard data, so that the client can send a processing request on the shard data to the shard server for processing the to-be-processed shard data, where each shard server is preset to correspond to multiple hash value ranges. The shard server 703 is configured to receive, from a client, by a shard server, a processing request on shard data, where the processing request includes a data identifier of the shard data, and the processing request includes a write request and a read request; processing the processing request based on a hash table that is pre-loaded in a memory and that indicates a correspondence between the data identifier of the shard data and a data index to obtain a processing result, the data index includes a storage location of the shard data in a distributed file system; and sending the processing result to the client.

In some optional implementations of this embodiment, the shard server 703 includes a primary shard module (not shown), configured to: when the processing request is a write request, write the shard data to the distributed file system, and obtain a data index corresponding to the shard data; and write the data identifier and the data index to a log file of the distributed file system, and update the hash table corresponding to the primary shard module based on the data identifier and the data index.

In some optional implementations of this embodiment, the primary shard module is further configured to: copy the shard data by using the primary shard module to generate three data copies corresponding to the shard data, and write the three data copies to the distributed file system in append mode; and encode the three data copies by means of erasure coding, to generate 1.5 data copies corresponding to the shard data; and write the 1.5 data copies to the distributed file system.

In some optional implementations of this embodiment, the primary shard module is further configured to: when the processing request is a read request, find, based on a hash value corresponding to the data identifier, a data index corresponding to the data identifier from a location corresponding to the hash value in a hash table corresponding to the primary shard module; and read the shard data from the distributed file system based on the data index.

In some optional implementations of this embodiment, the shard server 703 further includes: a secondary shard module (not shown), configured to: when the processing request is a read request, find, based on the hash value corresponding to the data identifier, the data index corresponding to the data identifier from a location corresponding to the hash value in a hash table corresponding to the secondary shard module; and read the shard data from the distributed file system based on the data index.

In some optional implementations of this embodiment, the secondary shard module is further configured to: read incremental information corresponding to the primary shard module from the log file every read cycle, where the incremental information indicates new data identifiers and data indexes that are added compared with the previous read cycle; and update the hash table corresponding to the secondary shard module based on the incremental information.

In some optional implementations of this embodiment, when the primary shard module is faulty, the secondary shard module corresponding to the primary shard module is caused to serve as a primary shard module, so as to process the processing request.

In some optional implementations of this embodiment, the master server 702 is further configured to: determine, based on the hash value range that the hash value corresponding to the data identifier falls in, a primary shard module or a secondary shard module corresponding to the primary shard module for processing the to-be-processed shard data, where each pair of the primary shard module and the secondary shard module are preset to correspond to a same hash value range; and determine a shard server to which the primary shard module or the secondary shard module belongs based on a correspondence table between the primary shard module or the secondary shard module and the shard server The distributed storage system provided in this embodiment has the following characteristics:

1) High performance: The shard server has a hash table loaded in the memory, and the data indexes are all loaded in the memory, so that the processing time for a read request (or referred to as a query request) on shard data is close to the processing time for one random read request on the distributed file system, and therefore is as close as possible to the ultimate performance of the distributed file system. Compared with the prior art in which the sstable file is searched for shard data by binary search, the present application saves a large amount of time required for merging and search. In addition, the processing time for a write request on shard data is close to the time required for writing data to the index and data files in the distributed file system in append mode.

2) Low costs: 1.5 copy files of the data file are transferred by using the distributed file system, which saves the storage space compared with the prior art where data is stored using 3 copies.

3) High reliability: The storage of data by using the distributed file system with high reliability provides the same reliability as that of the distributed file system, thereby improving the reliability of the distributed storage system. A corresponding secondary shard module is set for each primary shard module, and the primary shard module and the secondary shard module are located on different shard servers, so that there is no single node in the system. In addition, when the primary shard module and the corresponding secondary shard module are faulty at the same time, because the data identifier of the shard data and the data index are both stored in the distributed file system with high reliability, the data index can be rebuilt within a short period of time from the distributed file system, so as to resume the processing of the write request and the read request, thereby further improving the reliability of the distributed storage system.

Figure 8:
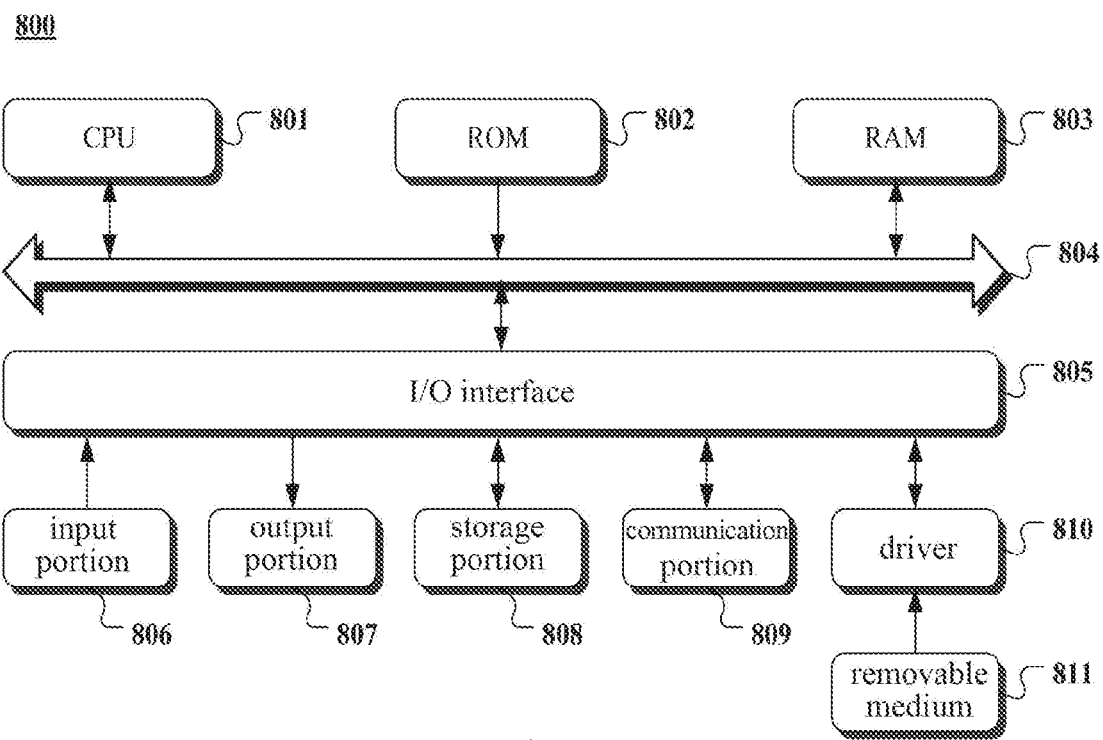
FIG. 8 illustrates a structural schematic diagram of a computer system adapted to implement a terminal device or master of the embodiments of the present disclosure.

Referring to FIG. 8, a schematic structural diagram of a computer system 800 adapted to implement a terminal device or master of the embodiments of the present disclosure is shown.

As shown in FIG. 8, the computer system 800 includes a central processing unit (CPU) 801, which may execute various appropriate actions and processes in accordance with a program stored in a read-only memory (ROM) 802 or a program loaded into a random access memory (RAM) 803 from a storage portion 808. The RAM 803 also stores various programs and data required by operations of the system 800. The CPU 801, the ROM 802 and the RAM 803 are connected to each other through a bus 804. An input/output (I/O) interface 805 is also connected to the bus 804.

The following components are connected to the I/O interface 805: an input portion 806 including a keyboard, a mouse etc.; an output portion 807 comprising a cathode ray tube (CRT), a liquid crystal display device (LCD), a speaker etc.; a storage portion 808 including a hard disk and the like; and a communication portion 809 comprising a network interface card, such as a LAN card and a modem. The communication portion 809 performs communication processes via a network, such as the Internet. A driver 810 is also connected to the I/O interface 805 as required. A removable medium 811, such as a magnetic disk, an optical disk, a magneto-optical disk, and a semiconductor memory, may be installed on the driver 810, to facilitate the retrieval of a computer program from the removable medium 811, and the installation thereof on the storage portion 808 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 809, and/or may be installed from the removable media 811. The computer program, when executed by the CPU 801, implements the functions as defined by the methods of the present disclosure.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

In another aspect, the present disclosure further provides a non-transitory computer storage medium. The non-transitory computer storage medium may be the non-transitory computer storage medium included in the apparatus in the above embodiments, or a stand-alone non-transitory computer storage medium which has not been assembled into the apparatus. The non-transitory computer storage medium stores one or more programs. The one or more programs, when executed by a device, cause the device to: receiving, from a client, a processing request on shard data, the processing request comprising a data identifier of the shard data, and the processing request being a write request or a read request; processing the processing request based on a hash table pre-loaded in a memory and indicating a correspondence between the data identifier of the shard data and a data index to obtain a processing result, the data index comprising a storage location of the shard data in a distributed file system; and sending the processing result to the client.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A method for reading data from and writing data to a distributed file system applied to a distributed storage system that includes:
    a first shard server, a second shard server, and the distributed file system, wherein the first and second shard servers are hardware-based servers,
    wherein data to be read and written includes pieces of shard data, and each piece of shard data is assigned a data index comprising a storage location of the each piece of shard data in the distributed file system,
    wherein each piece of shard data has a data identifier associated with it, and each piece of shard data has the data index assigned to it, and a correspondence between the data identifier and the data index is recorded in a hash table,
    wherein hash values of data identifiers of shard data are partitioned into different shards based on different hash value ranges, and each shard is of a hash value range different from each other,
    wherein the first shard server includes a memory with the hash table preloaded in the memory, and the first shard server further including a plurality of primary shard modules that are software modules, wherein each primary shard module in the plurality of primary shard modules is assigned a shard different to each other and is assigned a hash value range and is responsible to process read and write requests to a shard in the respective primary shard module with the hash value range that the each primary shard module is assigned,
    wherein the second shard server includes a plurality of secondary shard modules that are software modules, wherein each secondary shard module in the plurality of secondary shard modules is a backup of a corresponding primary shard module on the first server, the each secondary shard module is responsible to process read and write requests to a shard in the respective secondary shard module with a hash value range that is the same as a hash value range that the corresponding primary shard module in the first server is assigned, and each secondary shard module is assigned a shard different to each other,
    wherein the method comprises:
    receiving, by the first shard server, a processing request on a piece of shard data from a client, the processing request being a write request or a read request and comprising the data identifier of the piece of shard data;
    processing the processing request based on the hash table pre-loaded in the memory of the first shard server to obtain a processing result, comprising: processing the processing request by using one of the plurality of the primary shard modules located on the first shard server or by using one of the plurality of the secondary shard modules located on a second shard server, said primary shard module and said secondary shard module are determined based on a hash value range that a hash value corresponding to the data identifier of the piece of shard data falls in, and said primary shard module located on the first shard server and said secondary shard module located on the second shard server are preset to correspond to an identical hash value range; and
    sending the processing result to the client,
    wherein the method further comprises:
    in response to the processing request being a write request, the one of the plurality of the primary shard modules or the one of the plurality of secondary shard modules writes the piece of shard data to the distributed file system.

2. The method according to claim 1, wherein after the one of the plurality of the primary shard modules or the one of the plurality of secondary shard modules writes the piece of shard data to the distributed file system, the method further comprises:
    writing the data identifier and a data index corresponding to the piece of shard data to a log file of the distributed file system, and updating the hash table corresponding to the one of the plurality of the primary shard modules or the one of the plurality of secondary shard modules based on the data identifier and the data index corresponding to the piece of shard data.

3. The method according to claim 2, wherein the writing the piece of shard data to the distributed file system by using the one of the plurality of the primary shard modules comprises:
    copying the piece of shard data by using the one of the plurality of the primary shard modules to generate three data copies corresponding to the piece of shard data, and writing the three data copies to the distributed file system in append mode;
    encoding the three data copies by means of erasure coding, to generate 1.5 data copies corresponding to the piece of shard data; and
    writing the 1.5 data copies to the distributed file system.

4. The method according to claim 2, wherein the processing request is a read request, and
    the processing the processing request based on the hash table pre-loaded in the memory of the first shard server to obtain the processing result comprises:
    finding, by using the one of the plurality of the primary shard modules based on a hash value corresponding to the data identifier, a data index corresponding to the data identifier from a location corresponding to the hash value in a hash table corresponding to the one of the plurality of the primary shard modules; and reading the piece of shard data from the distributed file system based on the data index.

5. The method according to claim 2, further comprising:
reading incremental information corresponding to the one of the plurality of the primary shard modules from the log file of the distributed file system every read cycle by using the one of the plurality of the secondary shard modules, wherein the incremental information indicates new data identifiers and data indexes that are added compared with a previous read cycle; and
updating the hash table corresponding to the one of the plurality of the secondary shard modules based on the incremental information.

6. The method according to claim 1, wherein the processing request is a read request, and
the processing the processing request based on the hash table pre-loaded in the memory of the first shard server to obtain the processing result comprises:
finding, by using the one of the plurality of the secondary shard modules corresponding to the one of the plurality of the primary shard modules based on the hash value corresponding to the data identifier, the data index corresponding to the data identifier from a location corresponding to the hash value in a hash table corresponding to the one of the plurality of the secondary shard modules; and
reading the shard data from the distributed file system based on the data index.

7. The method according to claim 1, further comprising:
when the one of the plurality of the primary shard modules is faulty, causing the one of the plurality of the secondary shard modules corresponding to the one of the plurality of the primary shard modules to serve as a primary shard module, so as to process the processing request.

8. A device according to claim 1, further comprising:
a processor; and
a memory, storing computer readable instructions executable by the processor, the computer readable instructions when executed by the processor, causing the processor to execute the method according to claim 1.

9. A non-transitory computer storage medium according to claim 1, further comprising: storing computer readable instructions executable by a processor, the computer readable instructions when executed by the processor, causing the processor to execute the method according to claim 1.

10. The method according to claim 1, further comprising:
reading incremental information corresponding to the one of the plurality of the primary shard modules from a log file of the distributed file system every read cycle by using the one of the plurality of the secondary shard modules, wherein the incremental information indicates new data identifiers and data indexes that are added compared with a previous read cycle; and
updating the hash table corresponding to the one of the plurality of the secondary shard modules based on the incremental information.

11. A data read and write method, applied to a master server in a distributed storage system, the distributed storage system comprising:
a first shard server, a second shard server, the master server, and a distributed file system, wherein the first and second shard servers are hardware-based servers, wherein data to be read and written includes pieces of shard data, and each piece of shard data is assigned a data index comprising a storage location of the each piece of shard data in the distributed file system,
wherein each piece of shard data has a data identifier associated with it, and each piece of shard data has the data index assigned to it, and a correspondence between the data identifier and the data index is recorded in a hash table,
wherein hash values of data identifiers of shard data are partitioned into different shards based on different hash value ranges, and each shard is of a hash value range different from each other,
wherein the first shard server includes a memory with the hash table preloaded in the memory, and the first shard server further including a plurality of primary shard modules that are software modules, wherein each primary shard module in the plurality of primary shard modules is assigned a shard different to each other and is assigned a hash value range and is responsible to process read and write requests to a shard in the respective primary shard module with the hash value range that the each primary shard module is assigned,
wherein the second shard server includes a plurality of secondary shard modules that are software modules, wherein each secondary shard module in the plurality of secondary shard modules is a backup of a corresponding primary shard module on the first server, the each secondary shard module is responsible to process read and write requests to a shard in the respective secondary shard module with a hash value range that is the same as a hash value range that the corresponding primary shard module in the first server is assigned, and each secondary shard module is assigned a shard different to each other,
wherein the method comprises:
receiving a query request sent from a client, wherein the query request comprises a data identifier corresponding to to-be-processed shard data; and
determining a shard server used for processing the to-be-processed shard data based on a hash value range that a hash value corresponding to the data identifier falls in, so that the client is capable of sending a processing request on the shard data to the determined shard server for processing the to-be-processed shard data, comprising:
determining the shard server where one of the plurality of the primary shard modules or one of the plurality of the secondary shard modules is located as the shard server used for processing the to-be-processed shard data, wherein said one of the plurality of the primary shard modules and said one of the plurality of the secondary shard modules are determined based on a hash value range that a hash value corresponding to the data identifier falls in, and said primary shard module and said secondary shard module are located on different shard servers and are preset to correspond to an identical hash value range, wherein each one of the plurality of the primary shard modules and the plurality of the secondary shard modules reads data from or writes data to the distributed file system,
wherein the method further comprises:
in response to the processing request being a write request, the one of the plurality of the primary shard modules or the one of the plurality of secondary shard modules writes the shard data to the distributed file system.

12. The method according to claim 11, wherein the determining the shard server used for processing the to-beprocessed shard data based on the hash value range that the hash value corresponding to the data identifier falls in comprises:
- determining the one of the plurality of the primary shard modules or the one of the plurality of secondary shard modules corresponding to the one of the plurality of the primary shard modules for processing the to-be-processed shard data based on the hash value range that the hash value corresponding to the data identifier falls in, wherein each pair of the one of the plurality of the primary shard modules and the one of the plurality of secondary shard modules are preset to correspond to an identical hash value range; and
- determining a shard server to which one of the plurality of the primary shard modules or the one of the plurality of secondary shard modules belongs based on a correspondence table between the one of the plurality of the primary shard modules or the one of the plurality of secondary shard modules and the shard server.

13. A method for reading data from and writing data to a distributed file system in a distributed storage system, the distributed storage system comprising a first shard server, a second shard server, a master server, and the distributed file system, wherein the first and second shard servers are hardware-based servers,
- wherein data to be read and written includes pieces of shard data, and each piece of shard data is assigned a data index comprising a storage location of the each piece of shard data in the distributed file system,
- wherein each piece of shard data has a data identifier associated with it, and each piece of shard data has the data index assigned to it, and a correspondence between the data identifier and the data index is recorded in a hash table,
- wherein hash values of data identifiers of shard data are partitioned into different shards based on different hash value ranges, and each shard is of a hash value range different from each other,
- wherein the first shard server includes a memory with the hash table preloaded in the memory, and the first shard server further including a plurality of primary shard modules that are software modules, wherein each primary shard module in the plurality of primary shard modules is assigned a shard different to each other and is assigned a hash value range and is responsible to process read and write requests to a shard in the respective primary shard module with the hash value range that the each primary shard module is assigned,
- wherein the second shard server includes a plurality of secondary shard modules that are software modules, wherein each secondary shard module in the plurality of secondary shard modules is a backup of a corresponding primary shard module on the first server, the each secondary shard module is responsible to process read and write requests to a shard in the respective secondary shard module with a hash value range that is the same as a hash value range that the corresponding primary shard module in the first server is assigned, and each secondary shard module is assigned a shard different to each other,
- wherein the method comprises:
- receiving a processing instruction on shard data, and sending a query request to the master server, the query request comprising a data identifier of the shard data;
- sending a processing request on the shard data to the first shard server or the second shard server, the first shard server and the second shard server being determined by the master server based on the data identifier of the shard data; and
- receiving a processing result returned from the first shard server after the first shard server processes the processing request, wherein the processing request is processed by using one of the plurality of the primary shard modules located on the first shard server or one of the plurality of the secondary shard modules located on the second shard server, said one of the plurality of the primary shard modules and said one of the plurality of the primary shard modules are determined based on a hash value range that a hash value corresponding to the data identifier of the piece of shard data falls in, and said primary shard module and said secondary shard module are preset to correspond to an identical hash value range,
- wherein the method further comprises:
- in response to the processing request being a write request, the one of the plurality of the primary shard modules or the one of the plurality of secondary shard modules writes the shard data to the distributed file system.

14. A distributed storage system, comprising a first shard server, a second shard server, and a distributed file system, wherein the first and second shard servers are hardware-based servers,
- wherein data to be read and written includes pieces of shard data, and each piece of shard data is assigned a data index comprising a storage location of the each piece of shard data in the distributed file system,
- wherein each piece of shard data has a data identifier associated with it, and each piece of shard data has the data index assigned to it, and a correspondence between the data identifier and the data index is recorded in a hash table,
- wherein hash values of data identifiers of shard data are partitioned into different shards based on different hash value ranges, and each shard is of a hash value range different from each other,
- wherein the first shard server includes a memory with the hash table preloaded in the memory, and the first shard server further including a plurality of primary shard modules that are software modules, wherein each primary shard module in the plurality of primary shard modules is assigned a shard different to each other and is assigned a hash value range and is responsible to process read and write requests to a shard in the respective primary shard module with the hash value range that the each primary shard module is assigned,
- wherein the second shard server includes a plurality of secondary shard modules that are software modules, wherein each secondary shard module in the plurality of secondary shard modules is a backup of a corresponding primary shard module on the first server, the each secondary shard module is responsible to process read and write requests to a shard in the respective secondary shard module with a hash value range that is the same as a hash value range that the corresponding primary shard module in the first server is assigned, and each secondary shard module is assigned a shard different to each other,
- the distributed storage system is configured to perform operations comprising:
- receiving, by a client, a processing instruction on a piece of shard data, and sending a query request to a master server, the query request comprising a data identifier of the piece of shard data; sending a processing request on the piece of shard data to the first shard server, the first shard server being determined by the master server based on the data identifier of the piece of shard data; and receiving a processing result returned from the first shard server after the first shard server processes the processing request;

receiving, by the master server, the query request sent from the client, wherein the query request comprises the data identifier corresponding to the piece of shard data; and determining the first shard server used for processing the piece of shard data based on the hash value range that the hash value corresponding to the data identifier falls in, so that the client is capable of sending the processing request on the piece of shard data to the first shard server for processing the piece of shard data; and receiving, from the client, by the first shard server, the processing request on the piece of shard data, the processing request comprising the data identifier of the piece of shard data, and the processing request being a write request or a read request; processing the processing request based on the hash table pre-loaded in a memory of the first shard server to obtain a processing result; and sending the processing result to the client, the processing request is processed by using one of the plurality of the primary shard modules located on the first shard server or one of the plurality of the secondary shard modules located on the second shard server, said one of the plurality of the primary shard modules and said one of the plurality of the primary shard modules are determined based on a hash value range that a hash value corresponding to the data identifier of the piece of shard data falls in, and said primary shard module and said secondary shard module are preset to correspond to an identical hash value range, wherein the operations further comprise:

in response to the processing request being a write request, the one of the plurality of the primary shard modules or the one of the plurality of secondary shard modules writes the piece of shard data to the distributed file system.

15. The system according to claim 14, wherein after the one of the plurality of the primary shard modules or the one of the plurality of secondary shard modules writes the piece of shard data to the distributed file system, the operations further comprise: writing the data identifier and a data index corresponding to the piece of shard data to a log file of the distributed file system, and update the hash table corresponding to the one of the plurality of the primary shard modules or the one of the plurality of secondary shard modules based on the data identifier and the data index corresponding to the piece of shard data.

16. The system according to claim 15, wherein the one of the plurality of the primary shard modules is further configured to: copy the piece of shard data by using the one of the plurality of the primary shard modules to generate three data copies corresponding to the piece of shard data, and write the three data copies to the distributed file system in append mode; encode the three data copies by means of erasure coding, to generate 1.5 data copies corresponding to the piece of shard data; and write the 1.5 data copies to the distributed file system.

17. The system according to claim 15, wherein the one of the plurality of the primary shard modules is configured to: when the processing request is a read request, find, based on a hash value corresponding to the data identifier, a data index corresponding to the data identifier from a location corresponding to the hash value in a hash table corresponding to the one of the plurality of the primary shard modules; and read the piece of shard data from the distributed file system based on the data index.

18. The system according to claim 14, wherein the one of the plurality of the secondary shard modules is configured to: when the processing request is a read request, find, based on the hash value corresponding to the data identifier, the data index corresponding to the data identifier from a location corresponding to the hash value in a hash table corresponding to the one of the plurality of the secondary shard modules; and read the piece of shard data from the distributed file system based on the data index.

19. The system according to claim 14, wherein the one of the plurality of the secondary shard modules is further configured to: read incremental information corresponding to the one of the plurality of the primary shard modules processing module from a log file of the distributed file system every read cycle, wherein the incremental information indicates new data identifiers and data indexes that are added compared with a previous read cycle; and update the hash table corresponding to the one of the plurality of the secondary shard modules based on the incremental information.

20. The system according to claim 14, wherein when the one of the plurality of the primary shard modules is faulty, the one of the plurality of the secondary shard modules corresponding to the one of the plurality of the primary shard modules is caused to serve as a primary shard module, so as to process the processing request.

21. The system according to claim 14, wherein the master server is further configured to: determine, based on the hash value range that the hash value corresponding to the data identifier falls in, the one of the plurality of the primary shard modules or the one of the plurality of secondary shard modules corresponding to the one of the plurality of the primary shard modules for processing the piece of shard data, wherein each pair of the one of the plurality of the primary shard modules and the one of the plurality of secondary shard modules are preset to correspond to a same hash value range; and determine a shard server to which the one of the plurality of the primary shard modules or the one of the plurality of secondary shard modules belongs based on a correspondence table between the one of the plurality of the primary shard modules or the one of the plurality of secondary shard modules and the shard server.

* * * * *